Figure 1:
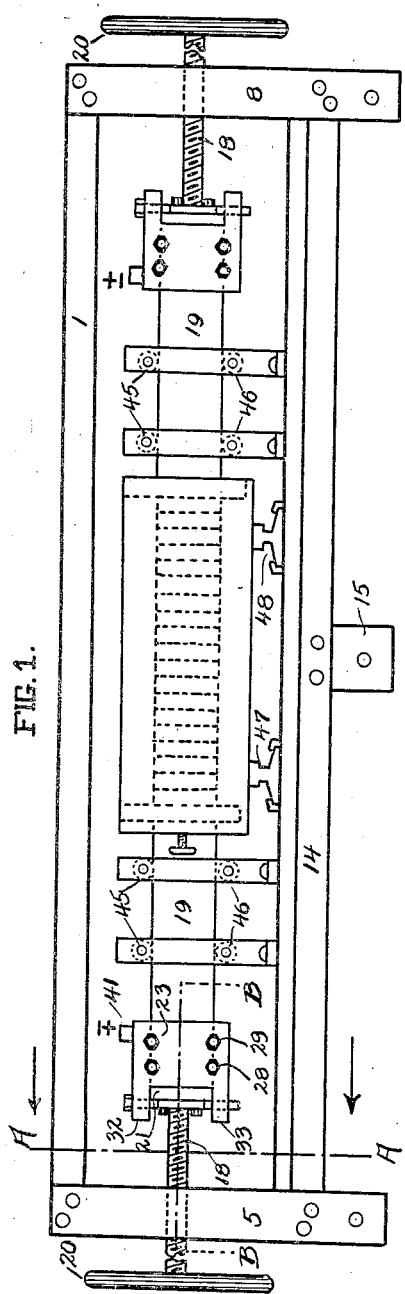

J. W. BROWN.
METHOD OF COMPRESSING BAKED CARBON ARTICLES AND CLOSING LAMINATIONS AND SEAMS THEREIN.
APPLICATION FILED JUNE 6, 1912.

1,121,792.

Patented Dec. 22, 1914.

2 SHEETS—SHEET 1.

WITNESSES

INVENTOR
JOHN W. BROWN
BY
ATTORNEY

J. W. BROWN.
METHOD OF COMPRESSING BAKED CARBON ARTICLES AND CLOSING LAMINATIONS AND SEAMS THEREIN.
APPLICATION FILED JUNE 6, 1912.
1,121,792.
Patented Dec. 22, 1914.
2 SHEETS—SHEET 2.
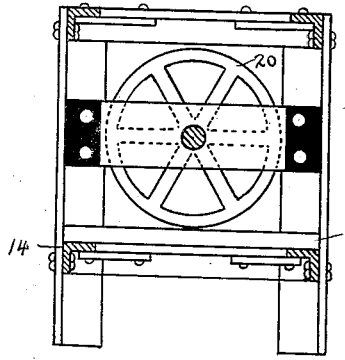
FIG. 3.
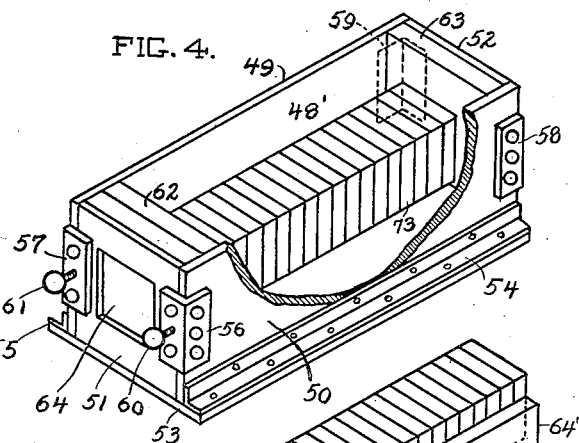
FIG. 4.
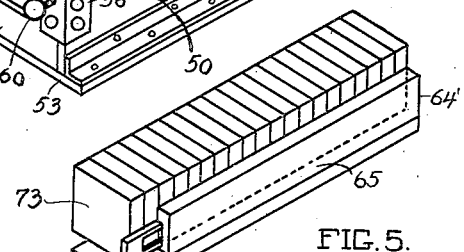
FIG. 5.
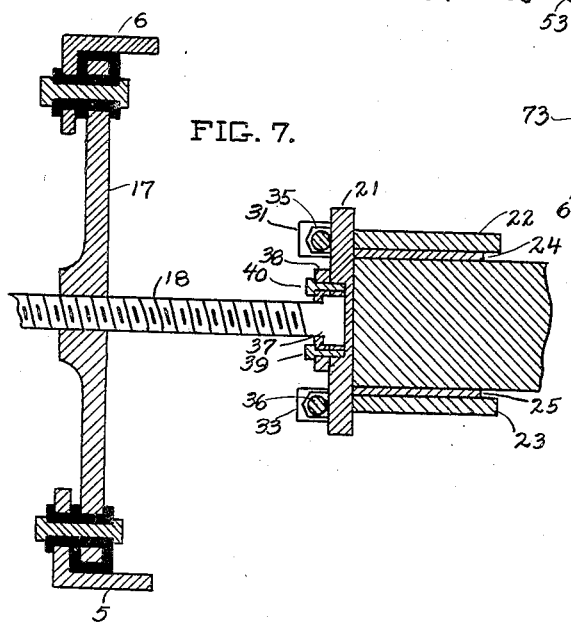
FIG. 7.
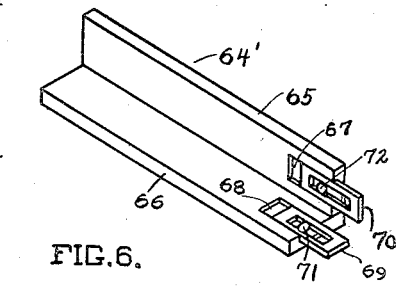
FIG. 6.
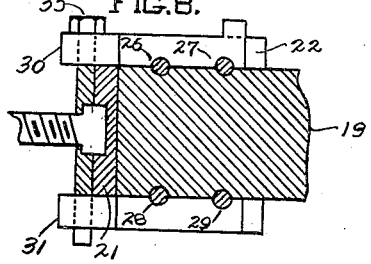
FIG. 8.
FIG. 9.
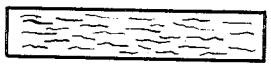
WITNESSES
H. Grover
V. A. Clark
INVENTOR
JOHN W. BROWN
BY Ira J. Adams
ATTORNEY

UNITED STATES PATENT OFFICE.

JOHN W. BROWN, OF LAKEWOOD, OHIO, ASSIGNOR TO NATIONAL CARBON COMPANY, OF CLEVELAND, OHIO, A CORPORATION OF NEW JERSEY.

METHOD OF COMPRESSING BAKED CARBON ARTICLES AND CLOSING LAMINATIONS AND SEAMS THEREIN.

1,121,792.  Specification of Letters Patent.  Patented Dec. 22, 1914.

Application filed June 6, 1912. Serial No. 702,119.

*To all whom it may concern:*

Be it known that I, JOHN W. BROWN, a resident of Lakewood, in the county of Cuyahoga, in the State of Ohio, have invented new and useful Improvements in Methods of Compressing Baked Carbon Articles and Closing Laminations and Seams Therein, of which the following is a clear and exact description.

This invention relates to the treatment of carbon articles.

One object of the invention is to compress baked carbon articles so as to increase their density and decrease their electrical resistivity.

Another object of the invention is to close the laminations and seams of baked carbon articles.

Other objects will appear in the appended description.

The term carbon in this application is intended to be used in its broad sense to cover amorphous carbon, graphite and other forms.

Baked carbon articles are somewhat porous due partly to the escape of volatile matter in the baking process, and partly to unfilled spaces between particles of flour from which it is made. This is objectionable as the resistance is therefore higher than it should be and, in the case of electrolytic anodes, the porosity causes the rapid deterioration of the anode due in part to the increased surface exposed to the attack of the electrolyte. The particles of porous electrodes are also easily dislodged and break off. The mechanical strength of the article is also impaired.

I have discovered a process whereby the articles can be made more dense by substantially relieving them of their porous nature. I have found that when carbon articles are heated to a very high temperature they become semi-plastic and the carbon material can be made to flow by applying pressure thereto. If a carbon plate having a depression therein, such as a countersunk letter or figure, be placed in contact with another smooth surfaced plate and pressed together between two electrodes through which a current of high density is passed, the plates will be heated to a very high temperature. At the high temperature the carbon becomes semi-plastic, and the pressure applied to the electrodes forces the material from one plate into the depression in the other. When the articles have been cooled it will be found that one has a raised counterpart of the sunken letter or figure of the other. This characteristic of carbon must not be confused with that due to uncoked binder. It is well known that "green" carbon articles are dense and solid at normal temperature and pressure, but become plastic under pressure, especially when heated enough to melt the uncoked binder. The plasticity of carbon that I refer to is that of a baked carbon article with coked binder. The boiling point of pure carbon is somewhere around 4000 degrees absolute and for a considerable range of temperature below the boiling point, it is plastic enough to flow under pressure. By similarly treating porous carbon articles the material can be compressed on account of its plasticity and made more dense. The resulting article will have lower resistivity and greater mechanical strength. It will also have less surface to be attacked by the electrolyte and evolved gases when used as an electrolytic anode.

The plastic or semi-plastic property of carbon serves another useful purpose which will now be described. Carbon articles when baked are liable to crack and form what I call laminations. This may happen in the usual hardening bake which is carried usually to 1000 degrees centigrade, but the defects are further increased in the graphitization of amorphous carbon articles by the Acheson process. In the latter process the percentage of defective articles is sometimes as high as 75% of the furnace charge. These were formerly utilized only as scrap, and the cost of forming the articles, baking and graphitization of them was a great loss.

I have found that if the defective articles are re-heated and put under pressure, that the laminations will be pressed together so that a smooth neat-appearing article results. The elimination of the seams prevents the accumulation of sand, grit and other foreign matter that may cause trouble especially in brushes for dynamo electric machines. The resistivity of the article is also lowered by the process. The temperature required to accomplish the result may be obtained by gas or other heat, but preferably by means of the electric current. A desirable way is to send the electric current through the articles to be treated. The method is not limited to any specific apparatus, but could be carried out by many different forms of appliances. However, for the purpose of completely disclosing the method, I have shown in the drawing a type of electrical apparatus well suited for the purpose. Apparatus heated by gas or other means could also be used.

Figure 2:
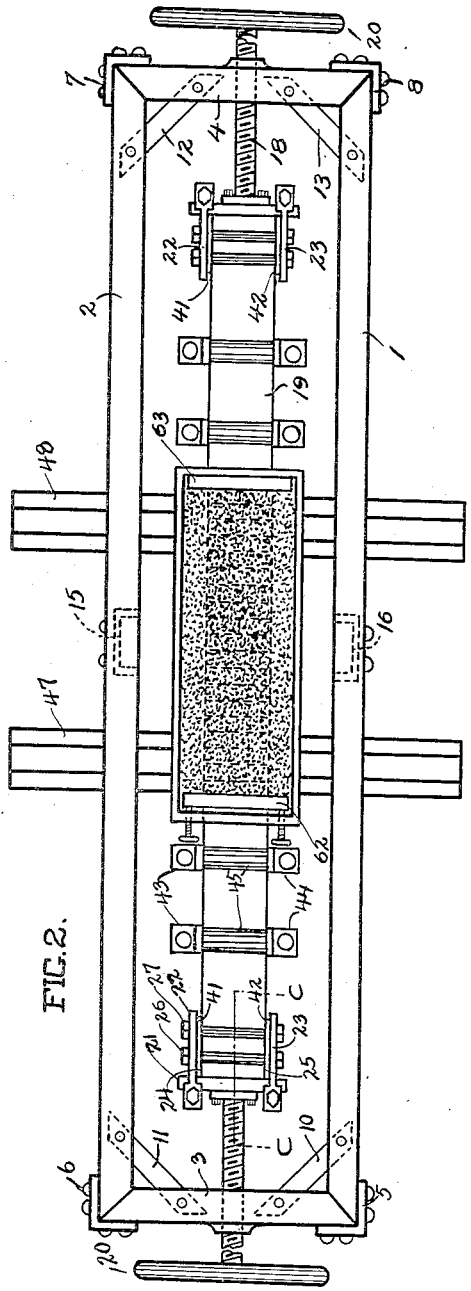

In the drawings: Figure 1 is a side elevation of the apparatus which may be called a furnace, although it has no resemblance to the usual type of furnace. Fig. 2 is a top view of the same. Fig. 3 is a sectional view taken on the line A—A of Fig. 1 looking in the direction indicated by the arrows. Fig. 4 is a view of the box containing the articles to be treated showing them clamped in place. Fig. 5 is a view of the device used to place the carbon articles in the box of Fig. 4. Fig. 6 is a view of the form shown in Fig. 5 before the articles are placed therein. Fig. 7 is a sectional view of parts of the furnace frame and electrode taken on the line B—B of Fig. 1. Fig. 8 is a sectional view of part of the electrode taken on the line C—C of Fig. 2. Fig. 9 is an enlarged end view of a brush having seams or laminations.

Referring to Figs. 1 and 2, the furnace frame can be made of wood or any other material, though it has been shown as being made of angle irons. At the top there are two angle irons 1 and 2 joined to similar irons 3 and 4 at the ends. The angle irons may be joined together in any way, but I have shown them as being mitered so as to form a neat joint, and riveted or jointed to four posts 5, 6, 7 and 8. In order to make the frame more rigid the irons may be braced by the braces 10, 11, 12 and 13.

The lower frame, one member of which 14 is shown in Fig. 1 is identical in all respects to the upper frame. I have shown two metal supports 15 and 16 fastened to the lower frame at the middle. The legs or supports of the furnace may be bolted to posts or pillars, or they may be simply fastened to a table or floor as desired. The lower frame is preferably covered with a layer of some non-conducting substance 16' such as transite board, composed of asbestos and cement. Such material forms a very strong board and will answer well the purpose in this arrangement.

By referring to Fig. 3 and Fig. 7, it will be seen that the member 17 is joined to the corner posts 5 and 6, and insulated therefrom. The insulation may consist of fiber board or any other well known suitable non-conducting material. A screw 18 connected to the electrode 19 passes through the threaded opening in the member 17. The screw is revolved by any means, but I have shown a wheel 20 which is insulated therefrom in any way. A good way to do this is to construct the spokes of wood. The electrode may be joined in any manner to the screw 18. I have shown a metal end plate 21 which rests against the end of the electrode 19, and is held in place by two plates 22 and 23.

In order to make good electrical connection with the electrode two copper plates 24 and 25 are clamped by the plates 22 and 23 against the electrode. The plates are held firmly by the bolts 26, 27, 28 and 29. Grooves are preferably cut in the edge of the electrode to admit of the passage of the four clamping bolts. The clamping plates 22 and 23 have two ears each 30, 31 and 32, 33 which extend past the end of the electrodes sufficiently to enable pins 35 and 36 to be passed behind the plate 21 through holes in the ears of the plates.

The screw 18 has a circular head 37 bearing in a circular cavity in the plate 21. The plate 38, having a corresponding cavity and a hole for the passage therethrough of the screw 18, is fastened to the plate 21 by appropriate means such as a screw 39 and a screw 40. Lugs 41 and 42 on the copper plates 24 and 25 are provided so that conducting cables can be connected thereto. These are marked ± and ∓ on the drawings to indicate that they are the terminals. The electrode is held in place and properly guided by pairs of straps 43 and 44 joined together by pairs of rollers 45 and 46 above and below the electrode. The rollers permit of the electrode being moved back and forth by means of the operating wheel 20 with minimum friction. The straps are secured to the board 16' by appropriate screws or bolts. The rollers 45, 46 and the straps 43, 44 could be formed of iron, but since they would form a closed magnetic circuit around the electrode, the hysteresis loss might be high enough to cause trouble. If either the straps or the rollers were made of non-magnetic metal this trouble would be avoided. The trouble could also be obviated by using some material such as transite or fiber for this purpose.

The right hand side of the furnace in all its details is exactly identical with that of the left hand which has just been fully described so that it is unnecessary to allude to it in particular. The parts of the electrode and its connections are numbered similarly to those on the right. Two iron rails 47 and 48 are fastened to the board 16' to serve as supports for the box which contains the articles to be heated and compressed.

The box shown in Fig. 4 consists of two sides 49 and 50 joined to two end pieces 51 and 52 and the bottom 53. These boards are preferably made of transite board or other materials that would serve the purpose equally as well. The box can be made stronger by means of angle irons 54 and 55 joined to the bottom and sides. End plates 56, 57, 58 and 59 may be fastened to the corners where the sides join the ends in order to further strengthen the box. The strengthening irons used on the box are not absolutely necessary, and in order not to render the showing confusing in Figs. 1 and 2 the box is there shown without them.

For a purpose to be later described two screws 60 and 61 are threaded through irons 56 and 57 and the member 51 to press against the conducting block 62. It is not necessary to have similar screws on the other end of the box, hence the conducting block 63 bears against the end member 52. The two end members 51 and 52 have openings therein to receive the two electrodes 19. The opening in the board 52 is not shown in Fig. 4, but it is identical with that in the end 51.

In order to facilitate the placing of the brushes in the box 48′, a device 64′ shown in Fig. 6 may be used. This consists of two boards 65 and 66 fastened together to form an angle. These boards may be made of any materials, but wood is most convenient. Two slots 67 and 68 in these boards receive members 69 and 70 in a loose fit. Screws or pins 71 and 72 pass through slots in the members 69 and 70, and hold them in place.

The use of the apparatus disclosed will now be given in detail. The articles to be heated and compressed are shown as blocks 73. These are placed side by side in the angled form 64′ as shown in Fig. 5 with the cracks or laminations approximately perpendicular to the direction of the electrodes. By referring to Fig. 5, it will be noted that the end block 73 extends past the boards 65 and 66, and is substantially flush with the ends of the members 69 and 70. The device 64′ with the brushes therein are taken by the operator and placed in the box 48′ and held so that the center line of the brushes is approximately in line with the center line of the blocks 62 and 63, and then the screws 60 and 61 are manipulated forcing the block 62 against the column of carbon articles, which clamps them firmly together against the block 63. The members 69 and 70 slide in the slots 67 and 68, and permit the carbon blocks to be clamped in place without clamping the device 64′ at the same time. The latter is then removed by the operator. If desired the box may be placed in the furnace and the current turned on without covering the articles with any heat insulating material. It is preferable, however, to fill the space in the box 48′ by some heat insulating material and in practice I have found that broken charcoal serves the purpose well. A bag of broken charcoal can be emptied into the box 48′ and it will flow into the space at the sides and below the carbon blocks 73. Sufficient charcoal should also be placed on top to cover well the carbon blocks. The box 48′ with the carbon articles and the heat insulating material is then placed by the operator on the rails 47 and 48 of the furnace and slid into place in proper alinement with the two electrodes 19. The wheels 20 are then manipulated to push the electrodes through the openings in blocks 62, 63 to press them against the carbon articles and more firmly press them in contact with each other. The current is then turned on. The current density may be any value desired. I have used current densities as high as 5000 amperes per square inch. An average density of 1000 amperes per square inch is sufficient to make the carbon articles semiplastic in a very short time. The time required, of course, will depend upon the density of the current. By making tests of various current densities I have found that an increase in current will bring about a much greater decrease in time. The articles need not be put under pressure till they begin to soften, but it is advisable to put some pressure on them at the start. After they begin to soften, the pressure may be increased by manipulating the handle 20. The essential thing is to put pressure on the articles when they become plastic. The method is therefore the same whether the pressure is applied before the current is turned on or after the articles begin to soften. I prefer, however, to put the full pressure on at the start. This is sufficient to compress the articles when they become plastic. When the process is complete the current is turned off and the electrodes are drawn from the opening in the end plates of the box 48′. The box is then removed and the contents dumped into a receptacle. Another box can have been filled by the one operator or by other if more are needed, so that the furnace can be kept almost continually in operation. The articles after this treatment will show no visible traces of seams or laminations and will be more dense than they originally were.

While the use of the device 64′ is very convenient in placing the carbon articles in place in the box 48′, it is not necessary to use this scheme alone. The box could be filled up with a proper amount of charcoal and then the articles could be placed in between the electrodes on top of the charcoal. I prefer, however, to use the device 64′.

The procedure for compressing articles to make them more dense is the same as previously outlined though, of course, when the sole purpose is to increase the density the articles are treated regardless of whether they are free from flaws or have cracks or laminations.

Having described my invention what I claim is:

1. The method of making a baked carbon article more dense, which consists in placing it under pressure and passing an electric current therethrough to cause the carbon particles to flow into the voids of said article.

2. The method of making a baked carbon article more dense which consists in heating it till it becomes plastic and putting it under pressure to cause the particles to be pressed together.

3. The method of closing laminations and seams in a baked carbon article which consists in passing an electric current through the article till it becomes plastic and putting it under pressure whereby the layers are pressed together.

4. The method of closing laminations and seams in a carbon article which consists in heating it to a high temperature and putting it under pressure to cause the article to take a permanent set and the laminations to be pressed together.

In testimony whereof I have hereunto signed my name.

JOHN W. BROWN.

Witnesses:
I. J. ADAMS,
H. G. GROVER.